United States Patent
Berke

(10) Patent No.: US 6,629,092 B1
(45) Date of Patent: Sep. 30, 2003

(54) SEARCH ENGINE

(76) Inventor: Andrew Berke, 41 Wellington Rd., Matinecock, NY (US) 11560

(*) Notice: Subject to any disclaimer, the term of this patent is extended or adjusted under 35 U.S.C. 154(b) by 0 days.

(21) Appl. No.: 09/416,771

(22) Filed: Oct. 13, 1999

(51) Int. Cl.⁷ .............................................. G06F 17/30
(52) U.S. Cl. ...................... 707/3; 707/1; 707/2; 707/4; 707/10
(58) Field of Search ............................ 707/1–3, 4, 10; 705/26, 27, 14

(56) References Cited

U.S. PATENT DOCUMENTS

| | | | |
|---|---|---|---|
| 5,778,367 A | 7/1998 | Wesinger, Jr. et al. | 707/10 |
| 5,859,972 A | 1/1999 | Subramaniam et al. | 395/200.33 |
| 5,864,845 A | 1/1999 | Voorhees et al. | 707/5 |
| 5,864,846 A | 1/1999 | Voorhees et al. | 707/5 |
| 5,864,863 A | 1/1999 | Burrows | 707/103 |
| 5,884,309 A | 3/1999 | Vanechanos, Jr. | 707/10 |
| 5,893,110 A | 4/1999 | Weber et al. | 707/104 |
| 5,905,862 A | 5/1999 | Hoekstra | 395/200.32 |
| 5,926,798 A | 7/1999 | Carter | 705/26 |
| 5,950,173 A | 9/1999 | Perkowski | 705/26 |
| 5,961,601 A | 10/1999 | Iyengar | 709/229 |
| 6,009,459 A * | 12/1999 | Belfiore et al. | 709/203 |
| 6,023,683 A * | 2/2000 | Johnson et al. | 705/26 |
| 6,064,979 A * | 5/2000 | Perkowski | 705/26 |
| 6,131,162 A * | 10/2000 | Yoshiura et al. | 713/176 |
| 6,134,532 A * | 10/2000 | Lazarus et al. | 705/14 |
| 6,285,999 B1 * | 9/2001 | Page | 707/5 |

OTHER PUBLICATIONS

Creators of Premier Multimedia Email and Web Authoring Software, 1997 AltaVista Technology, Inc pp. 1–3.*
Hard copy printout of Internet www pages from Realnames web site, 1 page, URL is http://realnames.com, download date is Jun. 3, 1999.
Hard copy printout of Internet www pages from Centraal web site, 6 pages, URL is http://www.centraal.com, download date is Jul. 21, 1999.

* cited by examiner

Primary Examiner—Jean M. Corrielus
Assistant Examiner—Cam-Y Truong
(74) Attorney, Agent, or Firm—Dickstein, Shapiro, Morin & Oshinsky, LLP

(57) ABSTRACT

A search engine system, server and method receives input from a user terminal regarding a mark and a description of its associated products or services. The search engine searches a database table which will have one entity associated with the input data. The entity's web site, a constructed web site, and/or a list of authorized vendors for the products or services or an error message is then displayed to the user via the user terminal. Each database record comprises a unique combination of a mark and its associated goods or services. A registrant can enter and update records provided that the records still result in a unique mark/goods combination.

19 Claims, 6 Drawing Sheets

|   | 46 | 48 | 50 | 52 |
|---|---|---|---|---|
|   | AID | CAR PARTS | BLANK | AID AUTO STORE |
|   | ⋮ | | | |
| 44a | CADILLAC | APPAREL | WWW.CADILLAC.COM | GM |
| 44b | CADILLAC | AUTOMOBILES | WWW.CADILLAC.COM | GM |
| 44c | CADILLAC | DOG FOOD | WWW.EXPENSIVEDOG.COM | EXPENSIVE DOG |
|   | ⋮ | | | |
| 44d | COLGATE | DISHWASHING DETERGENT | BLANK | COLGATE-PALMOLIVE, INC. |
| 44e | COLGATE | TOOTHPASTE | WWW.COLGATE.COM/PRODUCTS/INDEX.HTML | COLGATE-PALMOLIVE, INC. |
|   | ⋮ | | | |
| 44f | JOE'S | CARS | G:\CONSTRUCT\JOE\JOECAR.HTML | JOE'S CARS |
|   | ⋮ | | | |
| 44g | JOE'S | PIZZA | BLANK | JOE'S PIZZA |

FIG. 4

JOE'S CARS

1234 First Street
Anywhere, NY 12345

Our business is repairing cars

Hours: 9am-5pm

Please submit your e-mail address so that we may add your name to our mailing list.

SEARCH ENGINE

BACKGROUND OF THE INVENTION

This invention relates to a method of searching and providing the Uniform Resource Locator ("URL") for an Internet web page (the method itself sometimes referred to as a "search engine"), and specifically to a method for allowing a user to quickly access a company's home web page and/or authorized vendor list when the user knows the company's trademark and can provide a description of its products or services.

The Internet has experienced, and continues to experience, explosive growth. Simply defined, the Internet is a very large network of computers. The most common use of this network is through the World Wide Web ("the web"). Documents created for the World Wide Web as "web pages" are in the form of the Hypertext Markup Language (HTML) and are transferred using the Hypertext Transfer Protocol (HTTP).

In order to access information on a computer connected to the Internet network, the user needs to be able to find the computer which has the desired information. This requires knowledge of the computer's address, typically expressed in the form of Uniform Resource Locator ("URL"). The URL format is "http://www.xxxx.yyy". The first four letters "http" represent the transfer protocol. Other protocols include, for example, the file transfer protocol (ftp). The next three letters "www" indicate the name of the host computer having the desired information. Typically, Internet content providers use the designation "www" as the name of one or more computers storing and providing HTML web pages. The next set of characters "xxxx" is the domain name of the computer which contains the content to be accessed. Finally, the last set of characters "yyy" indicates the type of web site. For example, a commercial web site typically ends in "com" whereas web sites linked to educational institutions typically end in "edu" and government organizations end in "gov".

A problem arises in that the URL is not always intuitively related to a particular company. It is frequently very difficult to determine the URL for a known company. This phenomenon facilitated the development of search engines. Search engines receive information from a user concerning the type of site that a user wishes to visit, and then search the Web for all sites which potentially satisfy the user's criteria.

A typical user, interested in finding information about a topic, can use one of these search engines. Conventional search engines utilize categories (e.g. sports and travel), boolean logic word searches and sophisticated search algorithms to find relevant web sites. However, many users of the Internet are interested in locating information about a particular product or service associated with a single company. Entering the name of the company, product, or service into a conventional search engine generally yields a large number of undesired responses or "hits".

For example, a user might wish to find information about cars made under the CADILLAC trademark. Such a user would be interested in locating the CADILLAC home page—the site which contains general information about CADILLAC automobile products and which also provides links (http references to other files and sites) relating to more detailed information about CADILLAC products. The user would enter in the word "Cadillac" into a conventional search engine. Entering the word "Cadillac" into a popular search engine was found to yield 723 sites, one of which will be the home page for GENERAL MOTORS CADILLAC brand. Thus, a user, knowing the site he or she wishes to reach must now sift through all of this information to find the CADILLAC web site.

Other known search engines, like REALNAMES by CENTRAAL, create a database where subscribing companies' trademarks and their URLs are correlated. A user enters a company name, and the Web site which corresponds to that company is displayed on the user terminal's monitor. However, if the database has more than one company listed with the same name or trademark, a list of all companies associated with that mark is displayed to the user. For example, a user wishing to see the web site for AID AUTO STORES may enter the term "aid" into the service. This results in the display of a large quantity of web addresses on the user's terminal. Again the user must then sift through these addresses to find the web site of the company he or she wishes to see.

In addition, a user who wishes to purchase the goods or services affiliated with the mark must try to find a local vendor or conduct an on-line search in attempt to locate a remote vendor. Finding a local vendor can be time consuming and can involve multiple telephone calls if the user does not know who in their locale sells the desired goods. Conducting an on-line search may result in providing a list of potential remote vendors, but the user has no way of insuring that the vendors are reputable, or whether the goods sought are "authorized" for sale in their region, i.e., not "knock-offs" or grey market goods.

Therefore, it is desirable to have a search engine which can bring a user to a specific web site or home page when the user knows the mark and can provide a description of the products or services for which information is desired, and which can provide a user with a list of authorized vendors from which the good or service can be purchased.

SUMMARY OF THE INVENTION

The present invention enables a user terminal to automatically display a web site after a user has input a mark and a description of the product or service associated with the mark, and optionally, provide a list of authorized vendors for the product or service. The list of authorized vendors can be a URL or an actual list based on a user's geographic preference, as in the case with local sales merchants, or can be a list of remote on-line providers.

One aspect of the present invention provides a searching system for determining web site data associated with a mark, in which a server has access to a database. At least one user terminal is coupled to the server and establishes a communication session with the server through a communication network. At least one user uses the user terminal to enter search criteria, the search criteria comprising both the mark and goods associated with the mark. The server, in response to receipt of the search criteria, uniquely identifies a single web site corresponding to the search criteria.

As another feature of the present invention the server identifies the single web site by examining a database table in the database. The database table includes a list of marks, goods and web sites which identifies a single web site for each unique combination of a mark and its associated goods.

In addition, the search system software can cause the user terminal to display the identified web site.

The web site is additionally identified by a uniform resource locator.

As another feature, the web site is identified by a file location for a constructed web site.

The database can also further comprise a macro-list in which the macro-list has a product type and one or more corresponding product entries. A database table record in the database table matches the entered search criteria when the entered goods includes any entry from the entries corresponding to the product type.

As another aspect of the present invention, the database further includes at least one of a URL and an actual list of authorized vendors of the goods associated with at least one mark in the list of marks from which the server further identifies at least one of the URL and the actual list of authorized vendors corresponding to the search criteria.

The present invention also provides a search engine server in communication with at least one user terminal across a communication network in which the search engine server determines a web site associated with a mark. A storage device stores a database table and search engine software, the database table comprising at least one database record. A network interface communicates with the user terminal across the communication network. A central processing unit executes the search engine software in which the search engine software performs the functions of:

receiving search criteria from the user terminal, the search criteria comprising both the mark and goods associated with the mark; and identifying a single database table to locate a database record corresponding to the received search criteria.

An additional aspect of the present invention provides the search engine software with the ability to:

allow a user to use one of the user terminals to register a mark and goods associated with the mark;

verify that the combination of the mark and the corresponding description of the mark are unique with the database table; and store the mark and the associated goods of the mark in the database table in the case where the combination is unique.

As an additional aspect of the invention, the search engine software when executed by the central processing unit further performs the function of storing at least one of a URL and an actual list of authorized vendors associated with the mark in one of the database table and a separate database table.

The database table can additionally be arranged such that each database record comprises a registrant field corresponding to an entity associated with the mark in the database record.

The present invention further provides a method for determining a web site associated with a mark. According to the method, search criteria are received from a user terminal, the search criteria comprising the mark and goods associated with mark. A database table is searched to uniquely locate a single database record corresponding to the received search criteria.

Another aspect of the present invention includes the step of identifying at least one of a URL and an actual list of authorized vendors associated with the mark.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 4 is a diagram showing a database table structure;

FIG. 6 is a display of a sample constructed web site; and

DETAILED DESCRIPTION OF THE INVENTION

As used herein, the terms "mark", "trademark" and "service mark" are used interchangeably, but refer to the term, phrase and other identifying indicia associating a good or service with its provider.

Figure 1:
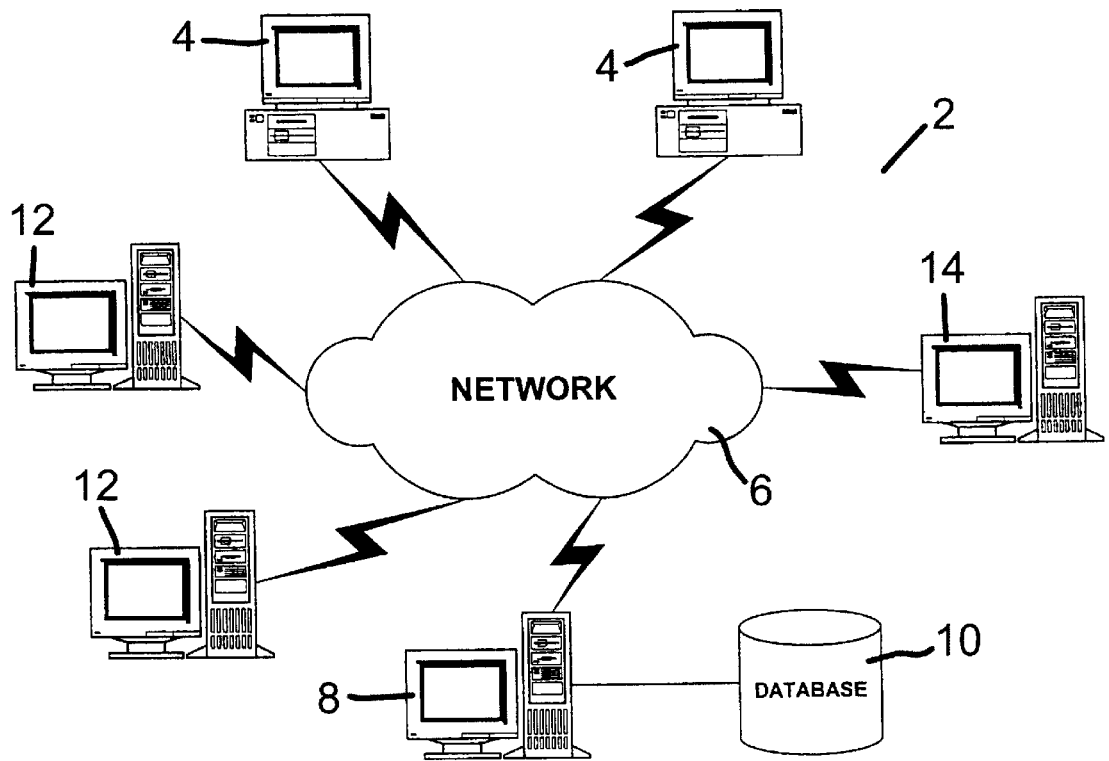
FIG. 1 is a diagram of a search system of the present invention.

Referring now to the drawings in which like reference numerals refer to like elements, there is shown in FIG. 1 a diagram of an example of search system 2 of the present invention. One or more terminals 4 allow users to enter and send queries to a search engine and are coupled to communication network 6. Communication network 6 is preferably the Internet. The search engine software of the present invention is stored and executed on search engine server 8.

The search engine software program can be created using, for example, one or a combination of C++, Java, Visual Basic, or any other contemporary programming language. Search engine server 8 is coupled to database 10 and network 6 so that it may send and receive information to and from both database 10 and other devices coupled to network 6. Search engine server 6 directs user terminal 4 to display either a company web site on company computer 12 or a constructed web site made for the company. Data comprising the constructed web site can be stored in database 10 or on constructed web site computer 14. The operation of search engine server 8 and system 2 are discussed fully below.

Figure 2:
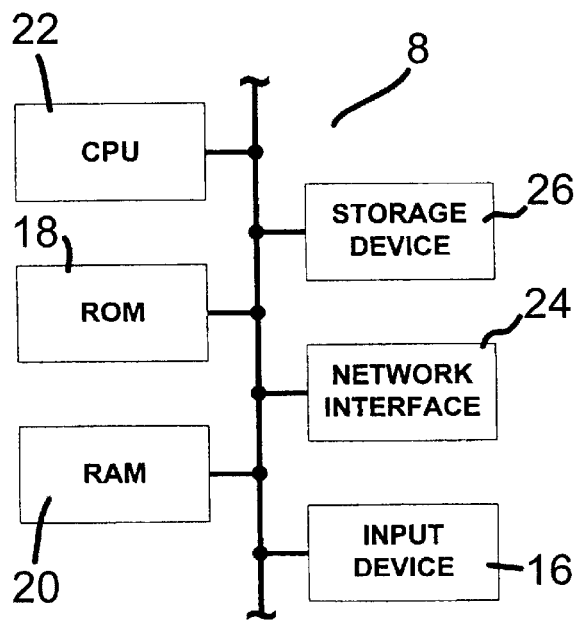
FIG. 2 is a block diagram of a search engine server of the present invention.

FIG. 2 shows the hardware components of search engine server 8 as used in the present invention. Server 8 preferably comprises one or more input devices 16, such as a keyboard and mouse, read only memory ("ROM") 18, random access memory ("RAM") 20, central processing unit ("CPU") 22, network interface 24 to transmit and receive data to and from other computer devices across network 6, and storage device 26 such as a hard disk drive, tape drive or CD-ROM for storing search engine software and other program code, databases and application data. The various components of server 8 need not be physically contained within the same chassis or even located at a single location. For example, database 10 can reside on storage device 26, but storage device 26 may be located at a site which is remote from the remaining elements of server 8, and may even be connected to CPU 22 across communication network 6 via network interface 24.

User terminals 4 have the ability to send and receive data across communication network 6, and the ability to display the received data on a display using appropriate communication software such as an Internet web browser. Web browser software includes, for example, web browser software on NETSCAPE or MICROSOFT INTERNET EXPLORER. User terminals 4 may be INTEL PENTIUM-based personal computers, but are not limited to such computers. Other user terminals which can communicate over a global computer network such as palmtop computers, personal digital assistance ("PDAs") and mass marketed Internet access devices, i.e., WEBTV, can be used.

User terminals 4 communicate with server 8 through communication network 6. The connections between user terminals 4 and network 6 can be any known arrangement for accessing a communication network, such as dial-up serial line interface protocol/point-to-point protocol ("SLIP/PPP"), Integrated Services Digital Network ("ISDN"), dedicated leased-line service, broad band (cable) access, Digital Subscriber Line ("DSL"), asynchronous transfer mode ("ATM") or other access techniques.

Company computer 12 can be any computer or computer system which is attached to communication network 6. Company computer 12 hosts web pages comprising data relating to the trademarked goods identified by server 8.

Constructed web site computer 14 can be any computer device capable of providing web page HTML and/or JAVA data to a requesting device, such as user terminal 4. For example, constructed web site computer 14 can be comprised of the same component types which comprise server 8.

Figure 3:
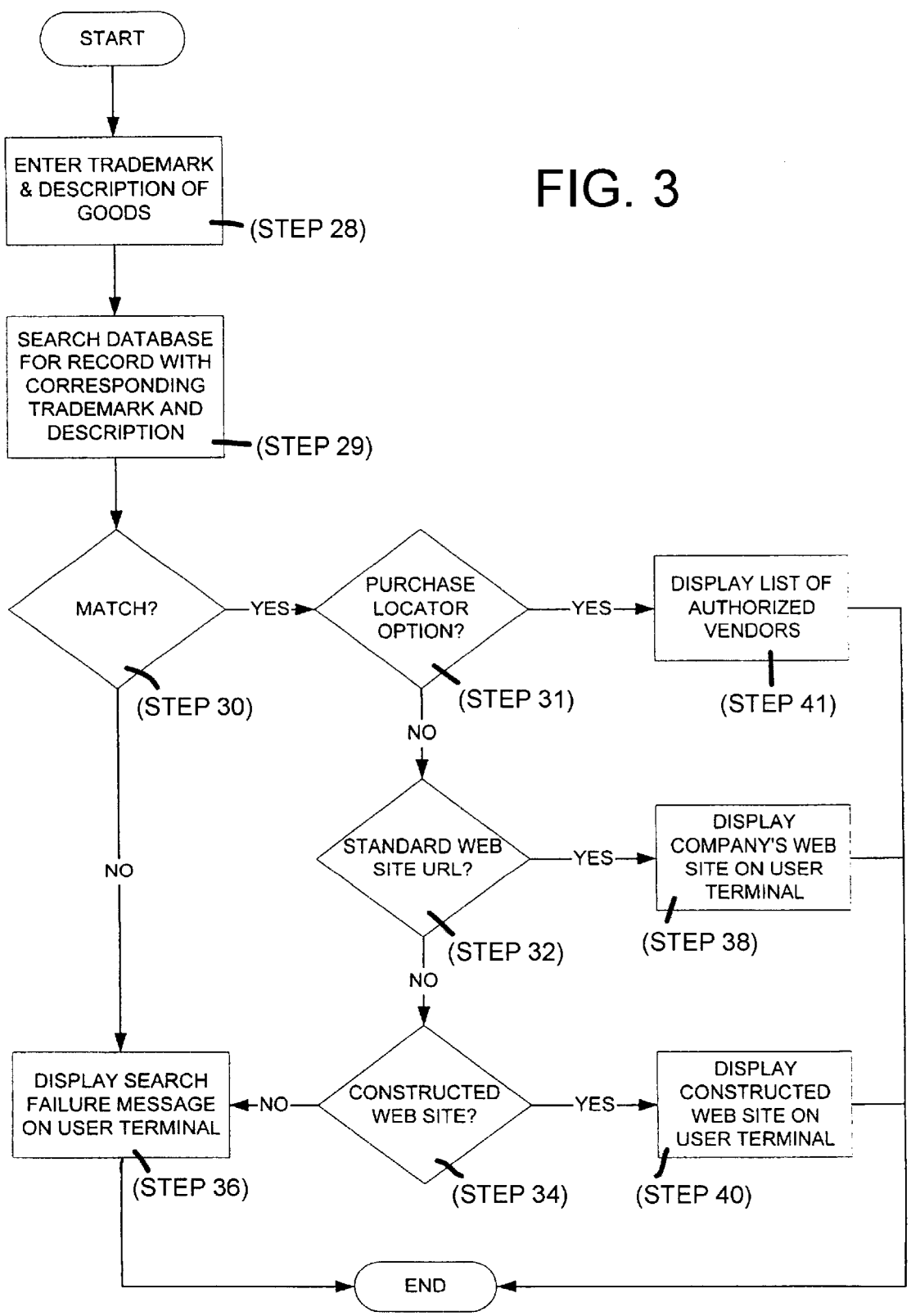
FIG. 3 is a flow chart detailing the operation of a search system of FIG. 1.

FIG. 3 is a flow chart detailing the operation of system 2 and server 8 in accordance with the present invention. A user accessing server 8 connects to the server 8 via user terminal 4. Upon connecting to server 8, server 8 causes user terminal 4 to prompt a user to enter search criteria of a trademark (or service mark or trade name) together with a description of the respective product or service (generally referred to herein as the "goods") for which the user wishes to see the corresponding web site (step 28).

As another embodiment, the user is also presented with a purchase locator option check box or other way to indicate that the user wants to be presented with at least one of a URL pointing to, and the actual list of, vendors authorized by the company to provide the goods. The format of the presentation (URL reference or actual list) to the user is based on the format of the data stored in database 10, discussed below. The user can be additionally requested to indicate whether he or she wants a list of local vendors or a list of on-line vedors. If a list of local vendors is preferred, the user is prompted to enter his or her zip code so that server 8 can match the user's location with the closest vendors.

This request is transmitted by user terminal 4 through network 6 to search engine server 8. Server 8 searches database 10 to relate the input data to a single company and its web site (step 29). Methods for searching a database to locate a record corresponding to given input criteria are known. While any suitable method can be used, one example layout of database 8 and its corresponding record format is discussed below.

When server 8 has located a database match (step 30) corresponding to the user's input search criteria, server 8 determines whether the user has elected the purchase locator option (step 31), whether the database entry contains a URL reference to a company's standard web site (step 32) or whether the database entry contains a reference to a constructed web site (step 34). When no match is found or where the corresponding database record has no corporate or constructed site reference, server 8 causes user terminal 4 to display a search failure message such as "No Matching Entry Found" (step 36). Of course, a plurality of error messages can be stored in server 8 and presented to a user in accordance with the specific error type or reason for failure.

If the company is found to have a standard web site in step 32, server 8 provides user terminal 4 with the URL and automatically directs user terminal 4 to display the corresponding web site (step 38). User terminal 4 can also display the corresponding URL without redirection so that the user may visit that site at a future time, i.e. manually.

A company may not have a web site or may choose not to conduct business online and yet still wish to be included in the invention so that the company may be more accessible to users. Such a company may desire a "constructed" web site in lieu of a standard web site. A constructed web site refers to a web site prepared and/or maintained by an entity other than the company whose products are on display and/or located at a site remote from that company, preferably the provider or an agent of server 8. In this case, a constructed web site may not have as much functionality or appeal as a standard web site, because it acts more as a placeholder for the trademark, serving as a way to provide a valid result for users searching for the associated mark.

If server 8 determines that the company has a constructed web site, server 8 displays that constructed web site on user terminal 4 (step 40). Server 8 can directly send the constructed web site data to user terminal 4 if the data is located in storage device 26, or can direct user terminal 4 to download the constructed web site data from constructed web site computer 14 by providing an appropriate URL or storage location reference. Alternatively, server 8 can transfer constructed web site data to itself from constructed web site computer 14 and subsequently download the data to user terminal 4.

When a user has selected the purchase locator option, server 8 provides user terminal 4 with the URL associated with the appropriate vendor list (local or remote vendors) and automatically directs user terminal 4 to display the list (step 41). User terminal 4 can also display the corresponding URL without redirection so that the user may visit that site at a future time. In the alternative, database 10 can store the actual list of local and remote vendors in a database table, and provide the list for display on user terminal 4. With both alternatives, those of skill in the art will recognize that the vendor URL or actual list can be displayed with, or instead of, the standard or constructed web site. For example, the actual authorized vendor list can be presented in a browser window separate from the web site display.

When a user enters query data, the user may choose one of many terms which could be used to describe that product. For example, a user could choose car, automobile, auto, etc. all to mean the same thing. This may cause confusion in searching for the correct product. One solution is to have the registering company register a list of all the synonyms for each product with which it wishes to be associated. This may not be feasible if the company is related to a large assortment of products.

Alternatively, database 10 can be populated by an already existing, accurate, database such as the list of Federally registered trademarks with the Trademark Office, or a list of Common Law trademarks. Companies which then wish to utilize the system would then pay to have their particular information enabled on the system.

A sample database table stored in database 10 mapping trademarks and their corresponding descriptions to web site URLs and constructed web site file locations is explained with reference to FIG. 4. Database table 42 is comprised of one or more database records 44. For example, FIG. 4 shows seven database records 44 as records 44a–g, each of which map marks and their corresponding products or services with web site URL's and constructed web site file locations.

In particular, each database record 44 is comprised of trademark field 46, goods field 48, reference field 50 and optionally, registrant field 52. For each database record 44, trademark field 46 contains the trademark associated with the particular goods described in goods field 48; Reference field 50 contains either the URL of the corresponding web site, a file location reference for a constructed web site, or blank (null) data.

For example, URL 54 "www.cadillac.com" is the Internet web site hypertext link associated with the combination of "Cadillac" trademark in trademark field 46 and the description "apparel" in goods field 48. Database table 42 also includes "GM" registrant 56 in registrant field 52 as representing the entity associated with the "Cadillac" trademark in database record 44*a*.

Database record 44*f* shows an example of a record having a reference to a constructed web site. In particular, a user entering "Joe's" as the trademark, and "cars" as its associated goods, i.e., product and/or service, will be presented with the data stored at constructed site reference 56, namely, the data at "g:\construct\joe\joecar.html."

A registrant may have registered a trademark and corresponding description so as to create an entry in database 42, but may not yet have an operational web site or constructed web site. For example, database record 44*g* contains blank data 60 in reference field 52. This allows a registrant to reserve their trademark and good description in database table 42 until such time as their web site or constructed site is operational.

In addition, database table 42 can be arranged to include one or more additional fields for each record corresponding to a vendor list or URL reference to the vendor list. Of course, a separate database table can be created to store URL and vendor list data.

Vendor list data preferably includes, for example, local company or franchise stores, national chains with local stores, local department stores, local small business retailers, mail order companies, links to on-line sites, etc.

It must be noted that, in order to preserve the integrity and functionality of system 2, the combination of trademark field 46 and goods field 48 in each database record 44 must be unique. As such, a registrant attempting to register their trademark with server 8 will receive an error message if the combination of the trademark field 46 and goods field 48 are not unique in database table 42. Preferably, software for determining marks which are spelled differently but have the same pronunciation is used to prevent such marks from being requested for the same goods. Similarly, it is preferred that software be provided to identify the same (or related) goods, even if different words (e.g., car or automobile) are used. This will also be used to prevent registration of the same or substantially the same marks for the same or substantially the same goods.

As used herein, the term "registrant" refers to the individual or entity adding or updating a record in database table 42, and is not necessarily limited to the registrant of a corresponding federal or state trademark.

An example of a registrant's entry of a record 44 is explained with reference to the flow chart of FIG. 5. A user who wishes to register a trademark and description in system 2 can do so using user terminal 4. Upon connecting to server 8, the registering user makes an appropriate selection to indicate that he wishes to register a trademark (step not shown). Server 8 causes user terminal 4 to display a registration entry screen arranged to accept data corresponding to trademark field 46, goods field 48, reference field 50, and optionally, registrant field 52. It is contemplated that server 8 can be configured to require a potential registrant to authenticate themselves with the system using a pre-established user ID and password. This would allow the provider of server 8 to exercise some control over record registration, and can also be used to ensure payment of any associated registration fees.

The registering user then enters their trademark and proposed description of goods (step 62). Server 8 searches database table 42 in database 10 (step 64) to determine whether the registrant's trademark and proposed description combination is unique (step 66). If the proposed combination is not unique, server 8 causes an error message to be displayed on user terminal 4 (step 68) along with a query as to whether the user wishes to try another combination (step 70). If the user wishes to try another combination, the process reverts back to step 62 in which the user is prompted to enter a trademark and proposed description of goods. The registration process ends if the user does not wish to try another combination.

Where the requested combination is unique, server 8 stores the trademark and its corresponding description in database table 42 (step 72), along with the corresponding web site URL or file location of the constructed web site (step 74). Preferably, server 8 also prompts the registrant as to whether an authorized vendor list or a URL to an authorized vendor list is to be entered, and when the response is positive, stores this data in database table 42 (or another database table if desired) in the record corresponding to the trademark and its corresponding description (step 75).

URL, file location and authorized vendor data need not be entered at the time of registering the trademark and corresponding description. Server 8 will preferably provide functionality which allows a registrant to edit their database entries to add or amend fields as necessary, including URL or file location information. However, server 8 will verify that the trademark and goods description fields remain a unique combination within database table 42 before any edited records are updated and permanently stored. Additionally, registrant field 52 corresponding to the entered record 44 can be input by the registrant.

Figure 5:
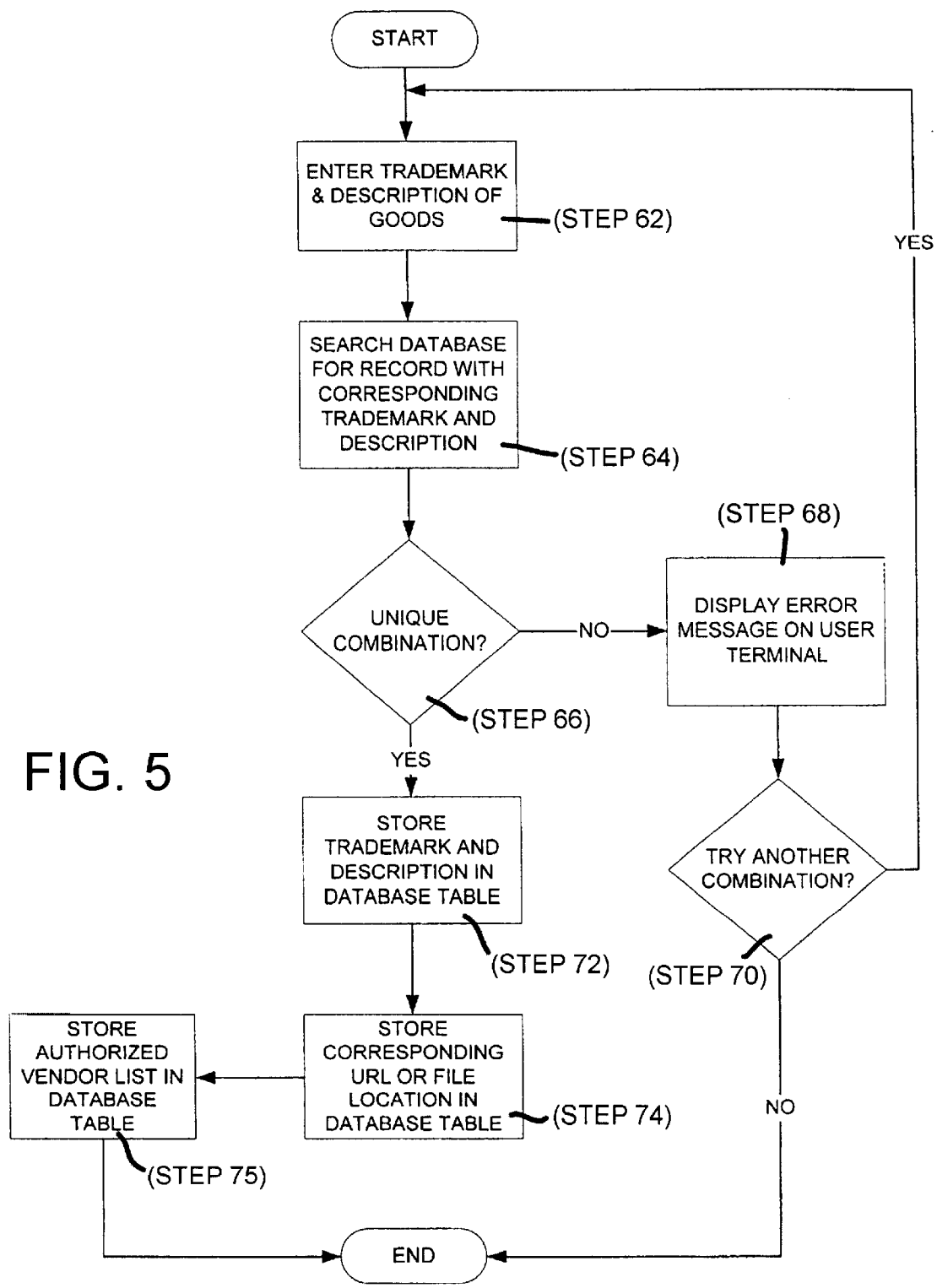
FIG. 5 is a flow chart of a record entry process of the present invention.

By using the process described in FIG. 5, the uniqueness of the trademark and goods fields can be assured such that a user searching for a company web site is assured of locating their desired destination web site.

It should be noted that although most companies will choose their home page as the page to be displayed to a user, it is possible that some companies would prefer to display a different site.

The web site associated with a particular trademark is typically designed, configured and maintained by the trademark owner, such that the operator of server 8 will not have the ability to control its content or presentation format. Although the same may be true with a constructed web site, as is the case where a registrant contracts with a third party to prepare the site, it is contemplated that constructed web sites will typically be designed and supported by the same entity supporting server 8.

FIG. 6 shows an example of a constructed web site presented on user terminal 4 in accordance with the present invention. In particular, constructed web site 76 corresponds to the data stored at the location referenced by constructed reference 58. In other words, a user searching for the trademark "Joe's" with a description of "cars" will be presented with constructed web site 76 on user terminal 4. Data entered by a user when interacting with a constructed web site such as constructed web site 76 can be stored in constructed site computer 14 or database 10 for future transmission or presentation to the registrant associated with the constructed web site.

A registrant can enter multiple unique trademark/goods combinations to provide better search results. This process can be time consuming and expensive. Alternatively, database 10 provides the capability to use a macro-list description which encompasses a multitude of descriptions.

Figure 7:
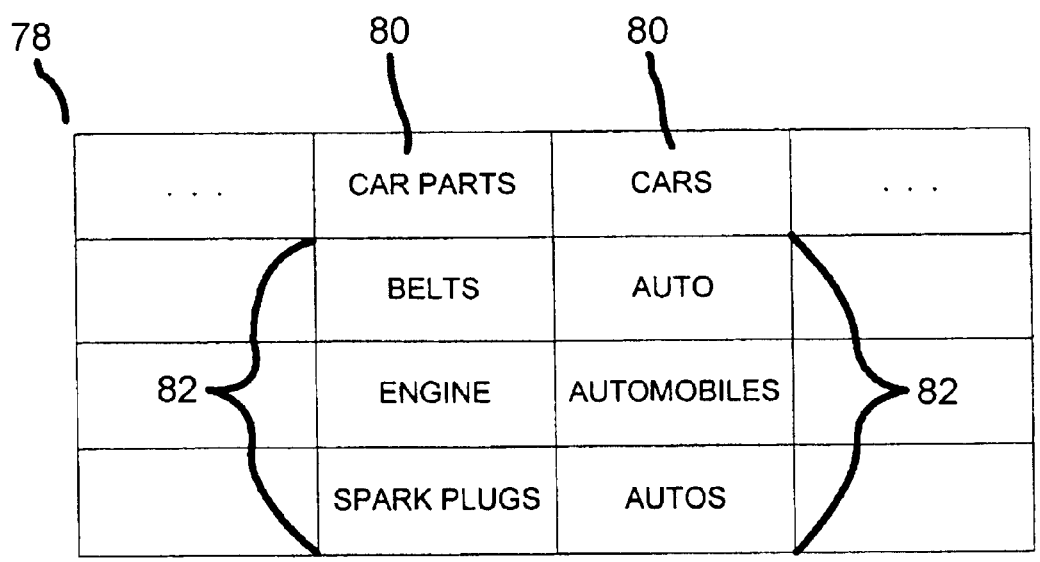
FIG. 7 is a diagram showing a portion of a macro-list database table.

An example of the implementation of this alternative description categorizing methodology is shown in FIG. 7, which shows products divided into a macro-list table 78. Macro-list table 78 is stored in database 10. Each product type 80, for example "car parts" in macro-list table 78, is associated with one or more product entries in corresponding micro-list 82. During the registration process, registrant is presented with the list of product types 80. The registrant can also create a new product type 80. For example, "Cadillac" might not be registered under "autos" and "automobiles", but under "cars" only. This will create a corresponding record or records in database table 42 which would result in a match if a user's query included any description represented in the corresponding micro-list 82.

Database table 42 can be arranged to include multiple records, one for each micro-list 82 entry, or a single record using product type 80. Product type 80 can be relatively linked to its corresponding micro-list 82 entries using known relational database technologies such that a user's query which includes any micro-list 82 description would still result in a match. For example, a car part retailer will register using the product type "car parts". When a user searches for a term which is found in a micro-list, that term is automatically associated with the corresponding term in the macro-list. For example, referring to FIGS. 4 and 7, if a user searches for the mark "Cadillac" in association with the goods "auto", server 8 will associate "auto" with "cars" and search for "Cadillac" with "cars", thereby displaying the web site associated with "www.cadillac.com."

Thus, by associating a URL with a combination of a trademark and its corresponding goods description as a search query, the result is a single web site and/or a list of authorized vendors from whom the goods can be purchased, not the plurality of web sites which were produced by prior art search engines. The list of authorized vendors provided by a registrant advantageously allows the registrant to control the distribution of its goods by only including approved vendors.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A searching system for determining a single web site associated with a company trademark, comprising:
   a server having access to a database, said database includes a list of company trademarks, products uniquely associated with said company trademarks, and web sites, said database identifies a single web site for each unique combination stored in the database of a company trademark and an associated product;
   at least one user terminal coupled to said server and establishing a communication session with said server through a communication network, at least one user using said user terminal to enter search criteria, said search criteria comprising both said company trademark and a product associated with said company trademark; and
   said server, in response to receipt of said search criteria, uniquely identifying the single web site corresponding to said search criteria by examining said database for the unique combination stored in the database.

2. The system according to claim 1, further comprising search system software, wherein said search system software causes said user terminal to display said single web site.

3. The system according to claim 1, wherein said web site is identified by a uniform resource locator.

4. The system according to claim 1, wherein said web site is identified by a file location for a constructed web site.

5. The system according to claim 1, wherein said database further comprises a macro-list, said macro-list having a product type and one or more corresponding product entries, wherein a database record in said database matches said entered search criteria when said entered product associated with said company trademark includes any entry from said entries corresponding to said product type.

6. The system according to claim 1, wherein said database further includes at least one of a URL and an actual list of authorized vendors of said product associated with at least one company trademark in said list of company trademarks, said server further identifying at least one of said URL and an actual list of authorized vendors corresponding to said search criteria.

7. A search engine server in communication with at least one user terminal across a communication network, said search engine server determining a single web site associated with a company trademark, the server comprising:
   a storage device storing a database and search engine software, said database comprising a list of company trademarks, products uniquely associated with said company trademarks, and web sites, said database including a single web site for each unique combination stored in the database of a company trademark and an associated product;
   a network interface, said network interface communicating with said at least one user terminal across said Communication network;
   a central processing unit executing said search engine software, said search engine software performing the functions of:
      receiving search criteria from said at least one user terminal, said search criteria comprising both a company trademark and products associated with said company trademark; and
      uniquely identifying said single web site corresponding to said received search criteria by examining said database to obtain the unique combination stored in the database.

8. The server according to claim 7, wherein said database further includes at least one of a URL and an actual list of authorized vendors of said product associated with at least one company trademark in said list of company trademarks, said server further identifying at least one of said URL and an actual list of authorized vendors corresponding to said search criteria.

9. The server according to claim 7, wherein said search engine software causes said user terminal to display said single web site.

10. The server according to claim 7, wherein said web site is identified by a uniform resource locator.

11. The server according to claim 7, wherein said web site is identified by a file location for a constructed web site.

12. The server according to claim 7, wherein said search engine software when executed by said central processing unit further performs the functions of:
- allowing a user to use one of said user terminals to register said company trademark and said product associated with said company trademark;
- verifying that a combination of said company trademark and said product associated with said company trademark are unique within said database; and
- storing said company trademark and said product associated with said company trademark in said database in the case where said combination is unique.

13. The server according to claim 12, wherein said search engine software when executed by said central processing unit further performs the function of storing at least of a URL and an actual list of authorized vendors of said product associated with said company trademark in one of said database and a separate database.

14. The server according to claim 7, wherein said database further includes a registrant field, said registrant field corresponding to an entity associated with a company trademark in said database.

15. A method for determining a single web site associated with a company trademark, said method comprising:
- receiving search criteria from a user terminal, said search criteria comprising a company trademark and a product associated with said company trademark; and
- uniquely identifying a single web site corresponding to said search criteria by examining a database, said database includes a list of company trademarks, products uniquely associated with the company trademarks, and web sites, and which includes a single web site for each unique combination stored in the database of a company trademark and an associated product.

16. The method according to claim 15, further comprising the step of causing said user terminal to display said single web site.

17. The method according to claim 15, wherein said web site is identified by a uniform resource locator.

18. The method according to claim 15, wherein said web site is identified by a file location for a constructed web site.

19. The method according to claim 15, further including the step of identifying at least one of a URL and an actual list of authorized vendors of said product associated with said company trademark.

* * * * *